United States Patent Office 3,397,175
Patented Aug. 13, 1968

3,397,175
RIGID POLYVINYL CHLORIDE
Robert C. Slagel, Burnsville, and Leonard A. Tushaus, Minneapolis, Minn., assignors to Ashland Oil & Refining Company, Ashland, Ky., a corporation of Kentucky
No Drawing. Filed Mar. 7, 1966, Ser. No. 532,095
11 Claims. (Cl. 260—45.85)

ABSTRACT OF THE DISCLOSURE

Properties of rigid polyvinyl chloride, such as its impact strength, are improved by incorporating therein a minor amount of certain Diels-Alder adducts of hexahalocyclopentadiene and a compound selected from the group of cycloolefins, vinyl aromatics, or monoethylenically unsaturated carboxylic acid derivatives, or carboxylic acid ester derivatives of adducts of hexahalocyclopentadiene with acyclic olefinic alcohols.

---

This invention relates to an improved rigid polyvinyl chloride. In another aspect, it relates to rigid polyvinyl chloride having incorporated therein certain Diels-Alder adducts of hexahalocyclopentadiene. In another aspect, it relates to a process for the preparation of improved rigid polyvinyl chloride.

Although the market potential of rigid polyvinyl chloride (an unplasticized material hereinafter occasionally called PVC) as a building construction and container material has been appreciated by the plastics industry for many years, it has not been significantly realized. A major factor holding up widespread exploitation of this plastic for such uses is its relatively low impact strength. Cases are known where rigid PVC has shattered in hail or shattered when birds dropped seashells on a PVC roof. Weathering of rigid PVC articles causes a rapid drop in impact strength.

Accordingly, an object of this invention is to improve properties of rigid polyvinyl chloride. Another object is to improve the impact strength of rigid PVC. Another object is to increase the utility of rigid PVC. Further objects and advantages of this invention will become apparent from the following description and appended claims.

Briefly, we have discovered that properties of rigid polyvinyl chloride can be improved by incorporating therein a minor amount of certain Diels-Alder adducts of hexahalocyclopentadiene and cycloolefins, vinyl aromatics, or monoethylenically unsaturated carboxylic acid derivatives, or carboxylic acid ester derivatives of adducts of hexahalocyclopentadiene with acyclic olefin alcohols. These adducts do not have any plasticizing effect on the rigid PVC, and thus rigid PVC when modified by incorporating such adducts is an unplasticized material. In particular, we have found that the impact strength of rigid PVC can be materially improved, and retained to a measurable extent after weathering, by incorporating such adducts, especially the Diels-Alder adducts of hexachlorocyclopentadiene and cyclooctene, cyclohexene, or styrene. The improved rigid PVC of this invention thus finds applicability in such construction materials as roofing, siding, trim, pipe, bottles, and other articles where high impact strength is desired, especially when exposed to weathering.

The Diels-Alder adducts used in this invention are known materials prepared by the well-recognized Diels-Alder reaction involving the condensation of a hexahalocyclopentadiene and a dienophile. The hexahalocyclopentadienes which can be used to form such adducts have the general formula:

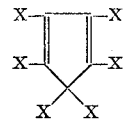

where the X's are the same halogen or different halogens, such as chlorine or bromine. One class of dienophiles used in this invention to prepare such adducts consists of cycloolefins having 5 to 12 ring carbon atoms, and representatively includes cyclopentene, cyclohexene, cycloheptene, cyclooctene, cyclododecene, cyclooctadiene, and the like.

A second class of dienophiles which can be used in this invention consists of vinyl aromatics, and representatively includes styrene, vinyl toluene, vinyl xylene, isopropylstyrene, tert-butylstyrene, and the like.

The unsaturated carboxylic acid derivatives such as is represented by diethyl maleate, dimethyl and diethyl tetrahydrophthalates, and 4-cyanocyclohexene, can also be used to form the adducts of this invention.

The aliphatic monocarboxylic acid esters of adducts formed by condensation of hexahalocyclopentadiene and acyclic olefinic alcohols having a single ethylenic bond, 1 or 2 hydroxy substituents, and 3 or 4 carbon atoms are also useful in this invention. These esters can be formed by esterifying the adducts of such alcohols with a carboxylic acid having 2 to 8 carbon atoms. Representative acyclic olefinic alcohols which can be used to form said adducts include allyl alcohol, 2-butene-1,4-ol, and the like. Representative ester derivatives of such Diels-Alder adducts include those of acrylic acid, methacrylic acid, acetic acid, and the like.

The improved rigid PVC of this invention can be prepared by incorporating the Diels-Alder adducts therein in any suitable fashion. For example, the adducts can be incorporated into the PVC on a roll mill or in a Banbury mixer. Suitable milling temperatures for this purpose will generally be found in the range of 200–400° F., preferably 300–350° F. The milled composition can be conventionally fabricated, for example, by extrusion or calendering. Extruded strands of the rigid PVC can be comminuted into pellets or the like, and this granulated material milled and extruded into desirable articles such as pipe or molded, for example, to form blow-molded bottles. The amount of adduct used or incorporated into the PVC can vary widely, and stated functionally will be that amount sufficient to improve the impact strength of the rigid PVC. Generally, the amount of the adduct used will be in the range of 1–20, preferably 3–10, weight percent based on 100 parts by weight of PVC. In addition, other conventional rigid PVC additives can be incorporated, for example, conventional vinyl stabilizer such as Thermolite 31 (tin mercaptide) and Ferro 1827 (a barium cadmium soap). The amount of vinyl stabilizer will be 1–10, preferably 2–3, weight percent per 100 parts by weight of PVC. In addition, conventional PVC lubricants can be incorporated, such as Neo-Fat 18 (stearic acid), Admex 966 (a mixture of palmitic, stearic, and myristic acids), stearic anhydride, various metallic stearates, waxes such as Carnauba wax, and the like. Generally, the amount of lubricant incorporated into the rigid PVC will be from 0.1–2, preferably 0.25–1, weight percent based 100 parts by weight of PVC. Other conventional rigid PVC additives, such as pigments, can also be incorporated. It is also within the scope of this invention to blend rigid PVC with other plastic materials, such as chlorinated polyolefins, e.g., chlorinated polyethylene, for example, in amounts of 1–10 weight percent per 100 parts by weight of PVC.

3

Also, the rigid PVC used can be a blend of suspension-type PVC and dispersion-type PVC. In any event, the improved PVC compositions of this invention will contain a major amount, i.e., at least 50 weight percent or more, of rigid PVC of the suspension-type.

The objects and advantages of this invention will be further illustrated by the following examples, but the particular materials and amounts thereof used in these examples, as well as temperatures and other details, should not be construed to unduly limit this invention.

Example I

In this example, a number of rigid PVC compositions containing various Diels-Alder adducts of hexahalocyclopentadiene were prepared and the impact strengths of the resultant milled compositions were determined. The procedure used in preparing these rigid PVC materials comprised mixing 100 parts by weight of rigid PVC (Geon 103EP–F7), 2 parts by weight of tin mercaptide stabilizer (Thermolite 31), 0.5 part by weight of stearic acid (Neo-Fat 18), and varying amounts of Diels-Alder adduct on a two-roll rubber mill at 330–340° F. for 10 mins. with constant working. The compounded PVC was sheeted-off at a thickness of about 20 mils. The milled PVC sheets were cut into 7 in. x 6 in. slabs and pressed in a 15-mil. mold on a laboratory press for 5 mins. at 320–340° F.

The impact strength of the PVC samples were determined by using a Gardner Variable Impact Tester. Impact strength was determined by subjecting a 1″ x 1″ sample of the rigid PVC to an impact of a 2-pound weight dropped upon the sample from a measured height. Repeated drops of the weight were made from gradually higher levels until the sample failed, i.e., until a tear developed or until it shattered, the point of failure being recorded as inch-pounds.

Table I sets forth the chemical structure for the various Diels-Alder adducts evaluated. Adducts designated as A, B, C, D, E, F, G, H and I are adducts found useful in this invention. Adducts J and K are adducts which are outside the scope of this invention, and they were also evaluated in this series of runs for purposes of comparison. In addition, the impact strength of rigid PVC per se (i.e., without any adduct) was evaluated for purposes of comparison.

The various adducts used were evaluated over a range of amounts, generally 5 to 15 parts by weight of adduct per 100 parts by weight of PVC. Table II summarizes the impact strength evaluation, and it includes the optimum impact strength found for each sample together with the level of amount of adduct at which this optimum impact strength was found.

TABLE

| Adduct designation | Structure of adduct |
|---|---|
| A | 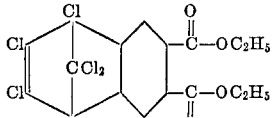 |
| B | 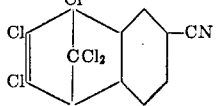 |
| C | 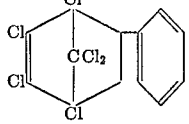 |

TABLE—Continued

| Adduct designation | Structure of adduct |
|---|---|
| D | 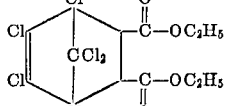 |
| E | 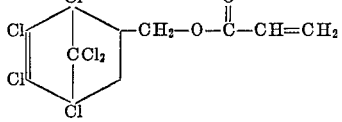 |
| F | 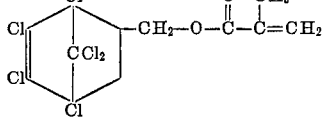 |
| G | 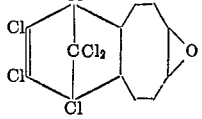 |
| H | 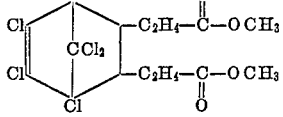 |
| I | 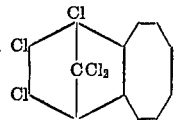 |
| J | 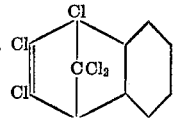 |
| K | 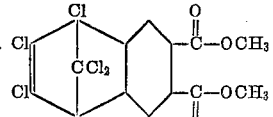 |

TABLE II

| Run | Adduct used | Range of amounts of adducts evaluated, parts per 100 parts PVC | Amount of adduct giving optimum impact strength, parts per 100 parts PVC | Optimum impact strength of modified PVC, inch-pounds |
|---|---|---|---|---|
| 1 | None | | | 36 |
| 2 | A | 5–50 | 7.5 | 56 |
| 3 | B | 5–15 | 10 | 73 |
| 4 | C | 5–15 | 5 | 65 |
| 5 | D | 10 | 10 | 42 |
| 6 | E | 5–10 | 5–10 | 46 |
| 7 | F | 5–15 | 5 | 65 |
| 8 | G | 5–10 | 10 | 38 |
| 9 | H | 5–15 | 5 | 60 |
| 10 | I | 5–15 | 5 | 50 |
| 11 | J | 5–15 | 15 | 25 |
| 12 | K | 5–15 | 5 | 31 |

The data of Table II show that as compared to the control or unmodified rigid PVC (i.e., Run 1), the impact strength obtained when an adduct of this invention was incorporated into the rigid PVC (i.e., Runs 2–10) was materially increased. These surprising and unexpected results are emphasized by the fact that other Diels-Alder adducts of hexahalocyclopentadiene (i.e., those used in Runs 11 and 12) did not improve the impact strength of rigid PVC.

Example II

In this example, the Diels-Alder adducts A, B, C, and F of Example I were further evaluated. The modified rigid PVC samples in these runs were prepared like that of Example I. Milled samples were exposed at outdoor sites in Arizona and Florida at 45° south. The impact strengths of these samples were determined in each case after 30 days, 60 days and 90 days exposure. The impact strength data obtained after such exposures are set forth in Table III together, for comparison purposes, with the initial impact strengths of such samples.

TABLE III

| Run | Adduct used | Optimum impact strength, inch-pounds | | | | | | |
|---|---|---|---|---|---|---|---|---|
| | | Initial | Arizona site, after— | | | Florida site, after— | | |
| | | | 30 days | 60 days | 90 days | 30 days | 60 days | 90 days |
| 1 | A | 40 | 32 | 20 | 10 | 32 | 32 | 24 |
| 2 | B | 48 | 32 | 24 | 10 | 36 | 28 | 26 |
| 3 | F | 56 | 25 | 24 | 10 | 28 | 28 | 18 |
| 4 | C | 40 | 20 | 6 | 10 | 26 | 24 | 14 |

The data of Table III show that notwithstanding the severe exposure of modified rigid PVC having incorporated therein adducts of this invention, the impact strength, though it decreased after such exposure, still had a significantly high level of impact strength. This is particularly true in the case of Adducts A, B and C. These adducts, viz., the Diels-Alder adducts of hexahalocyclopentadiene and cyclooctene, cyclohexene and styrene, are thus particularly useful where articles of rigid PVC are subject to outdoor exposure.

Although the primary concern of this invention is to improve the impact strength of rigid PVC, it should be understood that other properties of rigid PVC can be improved or enhanced by the practice of this invention, e.g., color, tensile strength, elongation, flame retardency, transparency, etc.

Various modifications and alterations of this invention will become apparent to those skilled in the art without departing from the scope and spirit of this invention, and it should be understood that this invention is not to be limited unduly to that set forth herein for illustrative purposes.

We claim:

1. A composition comprising rigid polyvinyl chloride and a minor amount sufficient to improve the impact strength, color, tensile strength, elongation, flame retardency or transparency thereof of a 1:1 Diels-Alder adduct of hexachlorocyclopentadiene and a compound selected from the group consisting of: (1) a cycloolefin selected from the group consisting of cyclopentadiene, cyclohexene, cycloheptene, cyclooctene, cyclododecene, and cyclooctadiene, (2) a vinyl aromatic selected from the group consisting of styrene, vinyl toluene, vinyl xylene, isopropyl styrene, and tert-butylstyrene, (3) a monoethylenically unsaturated carboxylic acid derivative selected from the group consisting of diethyl maleate, dimethyl tetrahydrophthalate, diethyl tetrahydrophthalate, and 4-cyanocyclohexene; or (4) an acrylic acid, methacrylic acid or acetic acid ester of a 1:1 Diels-Alder adduct of said hexachlorocyclopentadiene and an acyclic olefinic alcohol selected from the group consisting of allyl alcohol and 2-butene-1,4-ol.

2. The composition of claim 1, wherein said amount is 1–20 weight percent based on the weight of the rigid polyvinyl chloride.

3. The composition of claim 1, wherein said Diels-Alder adduct is an adduct of hexachlorocyclopentadiene and cyclooctene.

4. The composition of claim 1, wherein said Diels-Alder adduct is an adduct of hexachlorocyclopentadiene and cyclohexene.

5. The composition of claim 1, wherein said Diels-Alder adduct is an adduct of hexachlorocyclopentadiene and the dimethyl ester of tetrahydrophthalic anhydride.

6. The composition of claim 1, wherein said Diels-Alder adduct is an adduct of hexachlorocyclopentadiene and the diethyl ester of tetrahydrophthalic anhydride.

7. The composition of claim 1, wherein said Diels-Alder adduct is an adduct of hexachlorocyclopentadiene and 4-cyanocyclohexene.

8. The composition of claim 1, wherein said Diels-Alder adduct is an adduct of hexachlorocyclopentadiene and styrene.

9. The composition of claim 1, wherein said Diels-Alder adduct is an adduct of hexachlorocyclopentadiene and the diethyl ester of maleic anhydride.

10. The composition of claim 1, wherein said Diels-Alder adduct is the acrylic acid ester of an adduct of hexachlorocyclopentadiene and allyl alcohol.

11. The composition of claim 1, wherein said Diels-Alder adduct is the methacrylic acid ester of an adduct of hexachlorocyclopentadiene and allyl alcohol.

References Cited

UNITED STATES PATENTS 3,158,588  11/1964  Johnson _____ 260—45.75
3,313,857   4/1967  Gelfand _____ 260—648

DONALD E. CZAJA, Primary Examiner.

V. P. HOKE, Assistant Examiner.